United States Patent [19]

Mochizuki

[11] Patent Number: 5,246,533
[45] Date of Patent: Sep. 21, 1993

[54] APPARATUS FOR PRESS-BONDING TAPE ONTO EDGES OF WORKPIECE

[75] Inventor: Michio Mochizuki, Shizuoka, Japan

[73] Assignee: Marunaka Kakoki Co., Ltd., Shizuoka, Japan

[21] Appl. No.: 787,863

[22] Filed: Nov. 5, 1991

[51] Int. Cl.⁵ .............................................. B65C 9/00
[52] U.S. Cl. .................................... 156/475; 156/443; 156/581; 156/358; 156/363; 156/510; 156/523; 156/525; 156/526; 156/468; 156/574; 156/351; 156/267; 156/521
[58] Field of Search ............... 156/425, 443, 581, 358, 156/363, 510, 523, 525, 526, 468, 574, 351, 267, 521

[56] References Cited

U.S. PATENT DOCUMENTS 3,834,970  9/1974  Mitsuoka et al. ............... 156/521 X
4,853,058  8/1989  Riesmeier et al. .............. 156/523 X
4,925,515  5/1990  Yoshimura et al. ............. 156/510 X

FOREIGN PATENT DOCUMENTS 2529871  9/1982  France ........................... 156/574
1-95002   4/1989  Japan .

Primary Examiner—David A. Simmons
Assistant Examiner—M. Curtis Mayes
Attorney, Agent, or Firm—Paul A. Guss

[57] ABSTRACT

Disclosed herein is an apparatus for press-bonding a tape onto each of side faces of a workpiece. The apparatus basically comprises a tape press-bonding mechanism and a trimming mechanism both displaceable in the directions indicated by the arrows X, Y and Z. The former mechanism includes a pressure roller for press-bonding the tape onto the side faces of the workpiece with recesses defined therein, an actuator for displacing the pressure roller toward each of the side faces, a block member for supporting the pressure roller thereon, and a device for displacing the block member through a desired angle. The latter mechanism includes trimming cutters each movable along a follow-up roller, for removing an unnecessary portion of the tape, which projects from either the upper surface or the lower surface of the workpiece, a rotative drive source for rotatably driving the trimming cutters, a first actuator for displacing the trimming cutters so as to be held in front of the side faces of the tape, a block member for supporting the trimming cutters and the first actuator thereon, and a device for displacing the block member through a desired angle.

12 Claims, 10 Drawing Sheets

APPARATUS FOR PRESS-BONDING TAPE ONTO EDGES OF WORKPIECE

BACKGROUND OF THE INVENTION

1. Field of the Invention

The present invention relates to an apparatus for press-bonding a tape onto edges of a workpiece, and more particularly to a tape press-bonding apparatus capable of easily and reliably press-bonding a tape for covering portions such as inwardly heavily concaved edges of a plate-shaped panel, onto such portions.

2. Description of the Related Art

Panel-shaped members (hereinafter called merely "panels") have heretofore been designed in such a manner that decorative members are applied on the front and reverse faces thereof to smooth or otherwise enhance their appearance. On the other hand, tape-shaped members (hereinafter called merely "tapes") can be press-bonded onto side faces of the panels, i.e., their cut edges, thereby enhancing the appearance of the side faces thereof and ensuring their service durability. In this case, the press-bonding of the tapes to the side faces of the panels often tends to depend on labor. However, manufacturing cost then rises, and output efficiency is appreciably reduced.

Therefore, there has been proposed, as a new technical idea, an edge banding machine for automatically press-bonding a tape onto side faces of a panel, as disclosed in Japanese Patent Application Laid-Open No. 1-95002, for example. According to the disclosure, the tape can be press-bonded onto the side faces flattened in shape. It is, however, difficult in fact to press-bond the tape onto side faces of a panel where said side faces are deeply bent inwardly in shape, for example. More specifically, according to the edge banding machine referred to above, an edge banding head is structurally extremely large. Therefore, when each of the side faces of the panel is deeply contoured inwardly, i.e., recessed in shape, it is difficult to displace a pressure roller itself along its shape. Thus, a process for press-bonding the tape onto a panel having such a shape must depend on labor or manpower. In other words, there has not yet been proposed an apparatus for automatically press-bonding a tape onto side faces of a panel of complex shape.

SUMMARY OF THE INVENTION

It is a major object of the present invention to provide an apparatus for press-bonding a tape onto side faces such as edges of a panel, of a type wherein the appearance of the panel can be enhanced and an economical cost can be provided by bringing the tape into contact under pressure with each of the side faces of the panel so as to press-bond the same thereon without depending on labor or manpower.

It is another object of the present invention to provide an apparatus for press-bonding a tape onto side faces such as edges of a panel, of a type wherein even when the side faces of the panel are complicatedly curved or bent in shape, a tape press-bonding means can be displaced along the shape of each of the side faces, and sufficient press-bonding force can be applied to the panel and the tape by displacing the press-bonding means in the direction normal to each of the side faces thereof so as to bring the tape into contact under pressure with the side faces, thereby making it possible to prevent the tape from being easily separated from the panel.

It is a further object of the present invention to provide an apparatus for press-bonding a tape onto side faces of a workpiece, the apparatus comprising a tape press-bonding mechanism displaceable in X-axis, Y-axis, and Z-axis directions the mechanism including a pressure roller for press-bonding the tape onto the side faces of the workpiece with recesses defined therein, an actuator for displacing the pressure roller toward the side faces, a block member for supporting the pressure roller thereon, and means for displacing the block member through a desired angle.

It is a still further object of the present invention to provide the apparatus wherein a trimming mechanism for cutting an end of the tape and upper and lower surfaces thereof is arranged adjacent to the tape press-bonding mechanism, and the tape press-bonding mechanism is actuated to carry out a process for press-bonding the tape onto one of workpieces, and simultaneously the trimming mechanism is actuated to perform a process for trimming another workpiece disposed a predetermined distance from the one workpiece.

It is a still further object of the present invention to provide the apparatus wherein the actuator comprises a cylinder having a cylindrical rod held in engagement with the block member, the block member being engaged with a rotatable drive shaft of a rotative drive source, and the rotative drive source is energized to angularly displace the block member, followed by actuation of the cylinder when the pressure roller is placed in confronting relationship with each of the recesses defined in the side faces of the workpiece, thereby holding the pressure roller in front of the side faces of the workpiece from the direction normal to the side faces thereof.

It is a still further object of the present invention to provide the apparatus further including a roll tape holder having the tape wound therein and including a resilient element for applying a predetermined tension to the tape a pair of feed rollers for inserting the tape therebetween to thereby feed the tape so as to be wound on the pressure roller, and means disposed downstream of the feed rollers, for cutting the tape after it has been press-bonded onto the one workpiece.

It is a still further object of the present invention to provide the apparatus further including respective pairs of guide rollers disposed upstream of the feed rollers, for feeding the tape toward the pressure roller, and an adhesive-applying roller disposed downstream of the feed rollers, for applying an adhesive stored in an adhesive storage tank on the surface of the tape upon its delivery to the pressure roller.

It is a still further object of the present invention to provide the apparatus wherein an adhesive-holding roller is disposed so as to engage an outer peripheral surface of the adhesive-applying roller, and the adhesive-applying roller and the adhesive-holding roller are rotatably driven by the rotative drive source.

It is a still further object of the present invention to provide an apparatus for press-bonding a tape onto side faces of a workpiece, the apparatus comprising a trimming mechanism displaceable in the directions indicated by the arrows X, Y and Z, the mechanism including trimming cutters each movable along a follow-up roller, for removing unwanted portions of the tape which project from either the upper surface or the lower surface of the workpiece, a rotative drive source for rotatably driving the trimming cutters, a first actuator for displacing the trimming cutters so as to be held in front of side faces of the tape, a block member for supporting the trimming cutters and the first actuator thereon, and means for displacing the block member through a desired angle.

It is a still further object of the present invention to provide the apparatus wherein the follow-up roller comprises a side-face follow-up roller slidable along each of the side faces of the workpiece, and upper/lower-face ends follow-up rollers slidable along the ends of the upper and lower faces of the workpiece.

It is a still further object of the present invention to provide the apparatus further including end cutters for cutting an end of the tape press-bonded onto each of the side faces of the workpiece.

It is a still further object of the present invention to provide the apparatus wherein the end cutters each include a stationary blade and a movable blade, the apparatus further including a cylinder for displacing the movable blade toward the tape.

It is a still further object of the present invention to provide the apparatus wherein the end cutters and the trimming cutters are respectively arranged side by side.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

An apparatus for press-bonding a tape-shaped member (hereinafter called merely a "tape") onto edges, i.e., side faces of a workpiece, according to the present invention will now be described below with reference to the accompanying drawings in which a preferred embodiment is shown by way of illustrative example.

Figure 1:
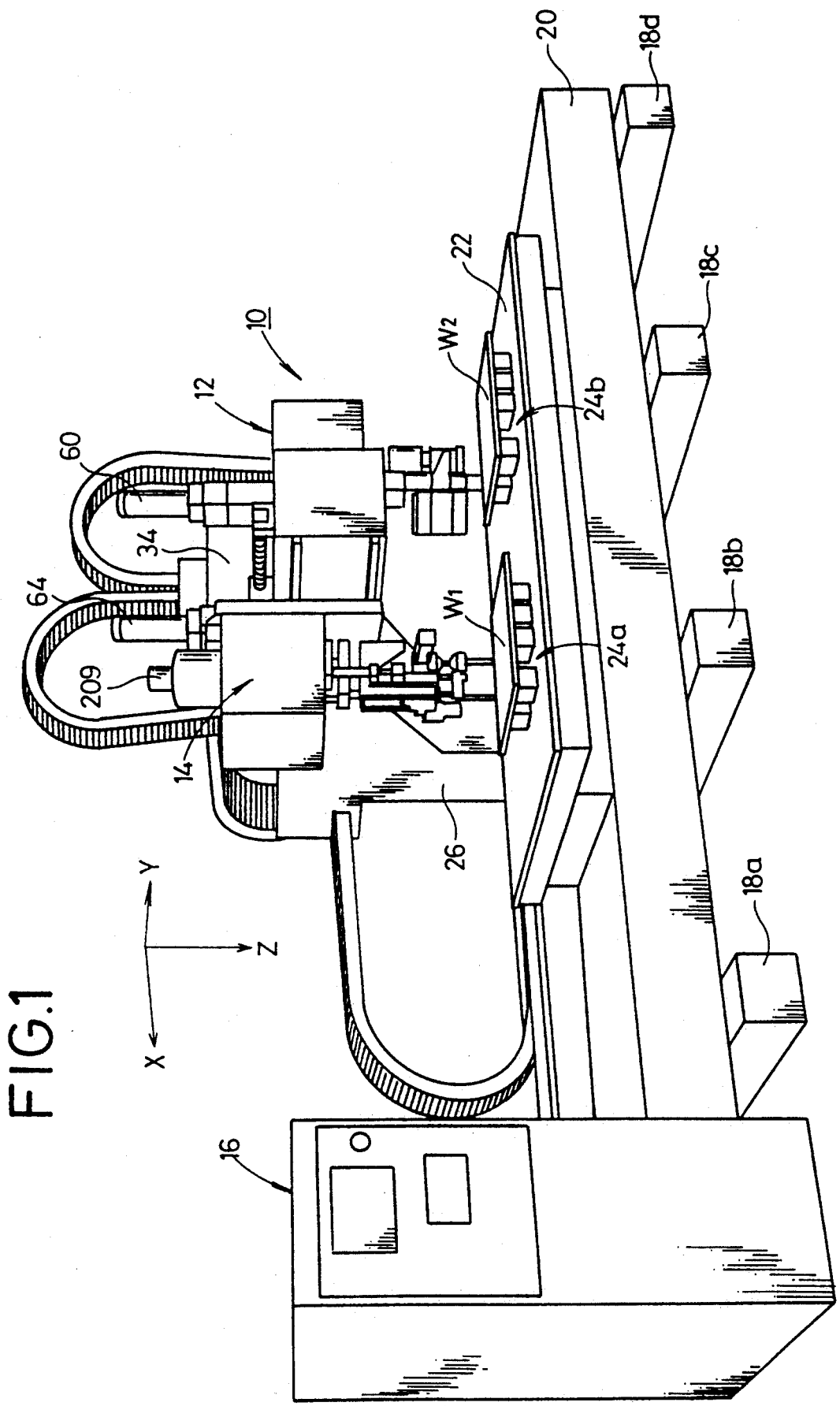
FIG. 1 is a perspective view of an apparatus for press-bonding a tape onto edges of a workpiece, according to one embodiment of the present invention.

Referring to FIG. 1, designated at numeral 10 is an apparatus for press-bonding a tape onto side faces of a workpiece. The apparatus 10 basically comprises a tape press-bonding mechanism 12, a trimming mechanism 14, and an NC controller 16. There is disposed on one side of the NC controller 16, a foundation base 20 supported by a plurality of support legs 18a through 18d. The foundation base 20 has an upper surface on which a table 22 is placed thereon. The table 22 has an upper surface on which a pair of suction box groups 24a, 24b is placed thereon in spaced-apart relationship to each other. Then, flat panels $W_1$, $W_2$ as workpieces are positioned on the suction box groups 24a, 24b respectively. This arrangement is because when a tape press-bonding step is being carried out with respect to one panel $W_1$ placed on the suction box group 24a, the other panel $W_2$ is placed on the suction box group 24b so as to enable a next tape press-bonding step to be placed in a waiting state.

There is disposed in facing relationship to the table 22, an upwardly-projected and horizontally-extending support 26 for supporting the tape press-bonding mechanism 12 and the trimming mechanism 14 thereon. The support 26 can be displaced in the direction indicated by the arrow X along a pair of rails 25 by a ball-type screw 27 and a servomotor 28 (see FIG. 3). There are also disposed on both sides of an arm of the support 26 extending horizontally thereof, i.e., extending in the direction indicated by the arrow Y, rails 30a, 30b and 32a, 32b, respectively. A holding unit 34 having the tape press-bonding mechanism 12 and the trimming mechanism 14 fixed to its opposite sides is held in engagement with the rails 30a, 30b and 32a, 32b. More specifically, the holding unit 34 has a holding plate 35 affixed to one side thereof and including guide members 36a, 36b mounted on one side of the holding plate 35. The guide members 36a, 36b are held in engagement with the corresponding rails members 30a, 30b. In the same manner as described above, the holding unit 34 also has a holding plate 37 fixed to the other side thereof and including guide members 38a, 38b mounted on one side of the holding plate 37. These guide members 38a, 38b are held in engagement with the corresponding rails 32a, 32b (see FIG. 4).

Figure 3:
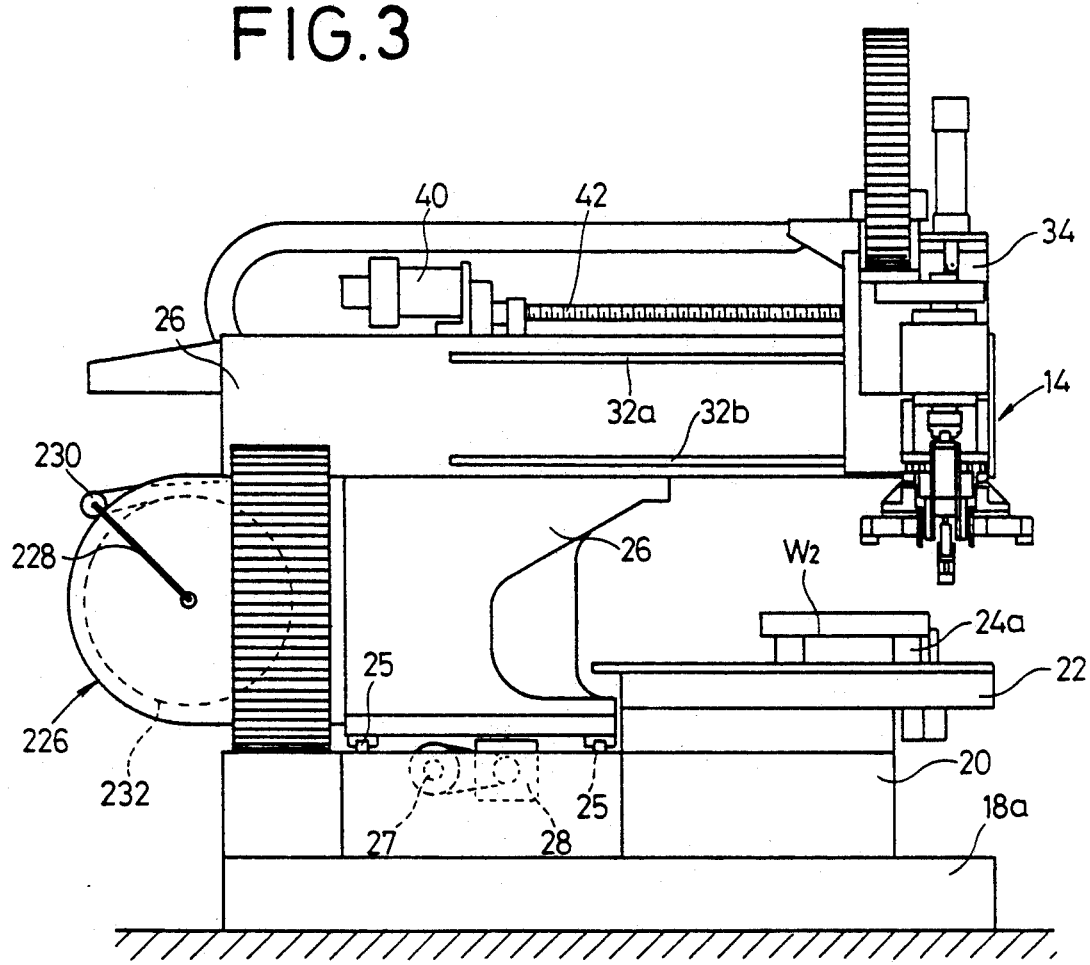
FIG. 3 is a side view of the apparatus.

As shown in FIG. 3, a servomotor 40 is fixedly mounted on an upper surface of the horizontally-extending arm of the support 26. A ball-type screw 42 is coupled via a rotational-force transmission mechanism to a rotatable drive shaft of the servomotor 40. The screw 42 extends to the leading end of the arm of the support 26, and threadedly engages the holding unit 34. Thus, it is easily understood that when the servomotor 40 is energized, a turning force produced by the servomotor 40 is transmitted to the ball-type screw 42, thereby making it possible to displace the holding unit 34 in the direction indicated by the arrow Y along the rails 30a, 30b and 32a, 32b.

Figure 4:
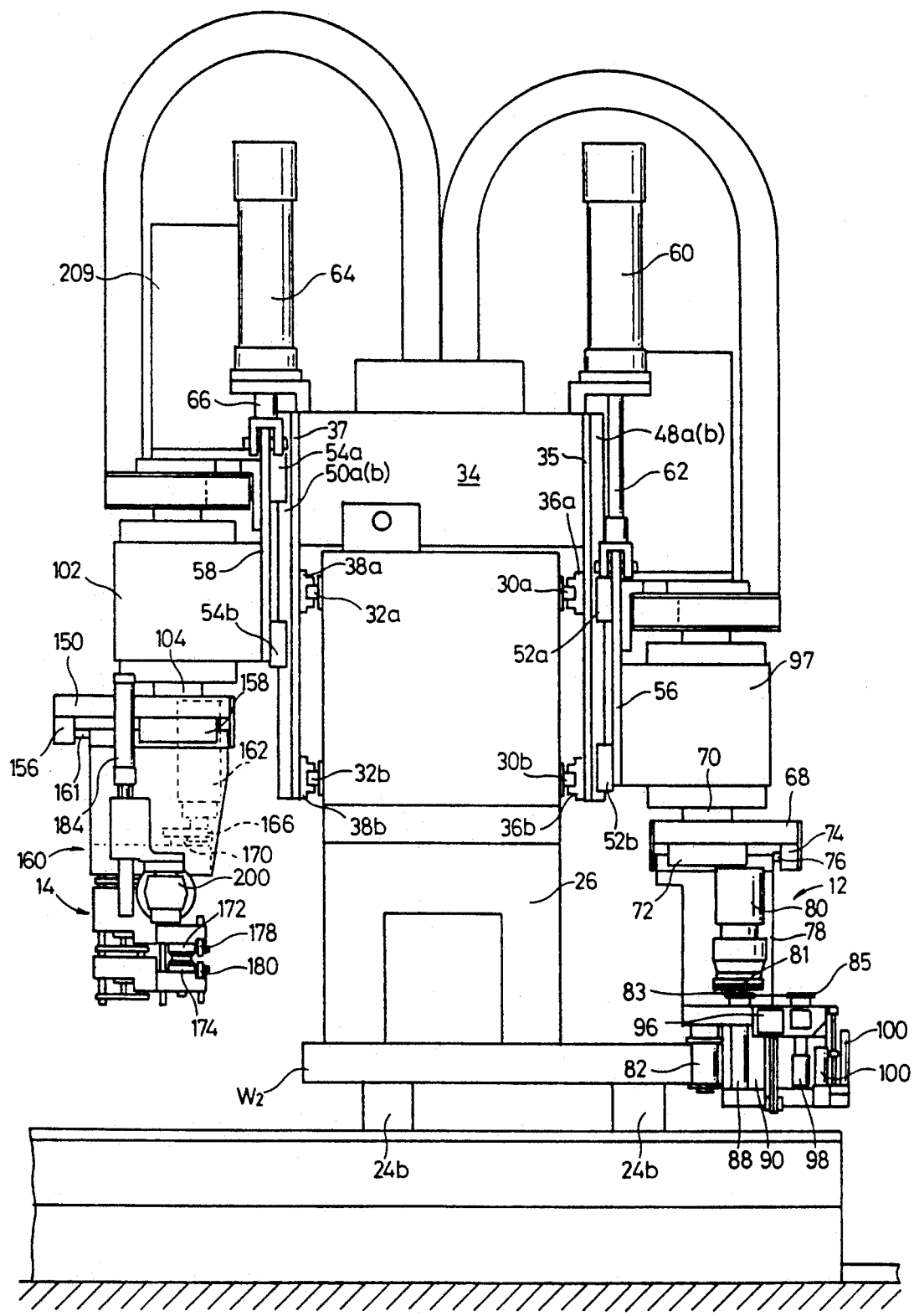
FIG. 4 is a fragmentary side view of the apparatus.

Then, as shown in FIG. 4, a pair of rails 48a, 48b extending in the direction indicated by the arrow Z is fixedly mounted on a surface of the holding plate 35 opposite the surface thereof on which the guide members 36a, 36b are fixedly mounted. Similarly, a pair of rails 50a, 50b extending in the direction indicated by the arrow Z is fixedly mounted on a surface of the holding plate 37 opposite to the surface thereof on which the guide members 38a, 38b are fixedly mounted. In addition, guide members 52a, 52b are held in engagement with the respectively corresponding rails 48a, 48b, whereas guide members 54a, 54b are held in engagement with the respectively corresponding rails 50a, 50b.

In this case, the guide members 52a, 52b are fixedly mounted on a plate-shaped member 56, and the guide members 54a, 54b are fixedly mounted on a plateshaped member 58. The plate-shaped member 56 supports on its upper surface the tape press-bonding mechanism 12, whereas the plate-shaped member 58 supports on its upper surface the trimming mechanism 14. Thus, when a cylinder 60 fixed to one of the opposite ends of the holding unit 34 is activated to displace the plate-shaped member 56 held in engagement with a cylindrical rod 62 thereof in the direction indicated by the arrow Z, the tape press-bonding mechanism 12 is displaced in the same direction as that indicated by the arrow Z in unison with the plate-shaped member 56. On the other hand, when a cylinder 64 fixed to the other of the opposite ends thereof is activated to displace the plate-shaped member 58 fixed to a cylindrical rod 66 thereof in the direction indicated by the arrow Z, the trimming mechanism 14 is also moved in the same direction as that indicated by the arrow Z.

A description will now be made of the tape press-bonding mechanism 12. The press-bonding mechanism 12 is fixedly mounted on the plate-shaped member 56 and has a servomotor 97 for turning a support block 78 to be described later about a $\theta$-axis. A rotatable drive shaft 70 of the servomotor 97 engages a holding plate 68, which has a guide member 72 fixedly mounted on a lower surface thereof and a pressure-applying air cylinder 74 fixed to an end thereof (see FIGS. 4 and 5). A cylindrical rod 76 exposed outwardly of the air cylinder 74 supports thereon the support block 78 held in engagement with the guide member 72. The support block 78 supports a rotative drive source 80 on its side. In addition, a sprocket 83 is mounted on a rotative drive shaft 81 projecting from the rotative drive source 80. The support block 78 supports on its side a tape pressure roller 82, an adhesive-applying roller 86, an adhesive-holding roller 88, etc. In addition, sprockets 84, 85 are rotatably mounted on the support block 78, and a chain 87 is trained around the sprockets 83, 84, 85. The adhesive-applying roller 86 is mounted on the shaft of the sprocket 83, whereas a pair of tape feed rollers 98 is mounted on the shaft of the sprocket 85. Further, the support block 78 also supports on its side the adhesive-holding roller 88 and an adhesive storage tank 90.

Figure 5:
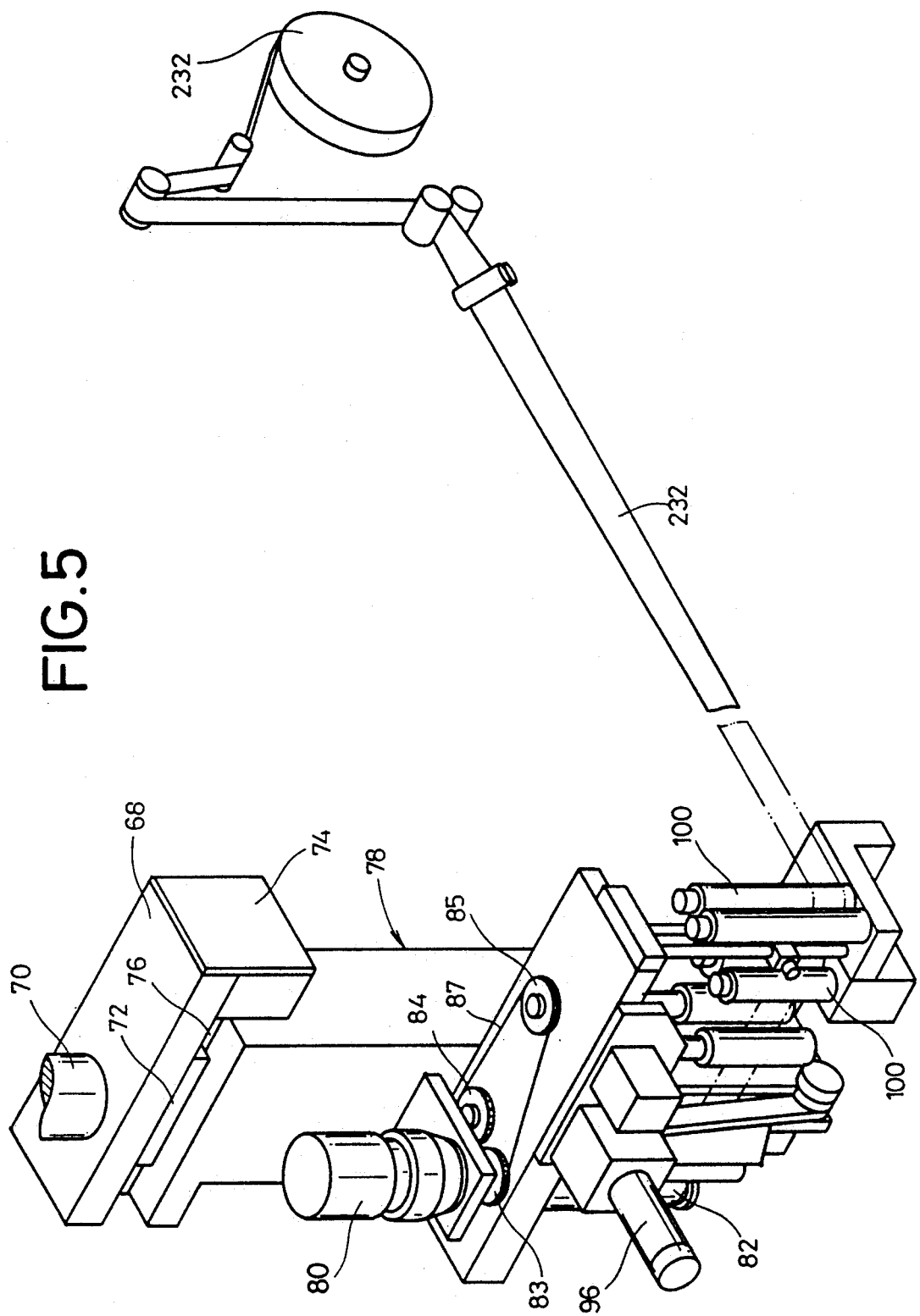
FIG. 5 is a schematic perspective view of a press-bonding mechanism of the apparatus.
Figure 6:
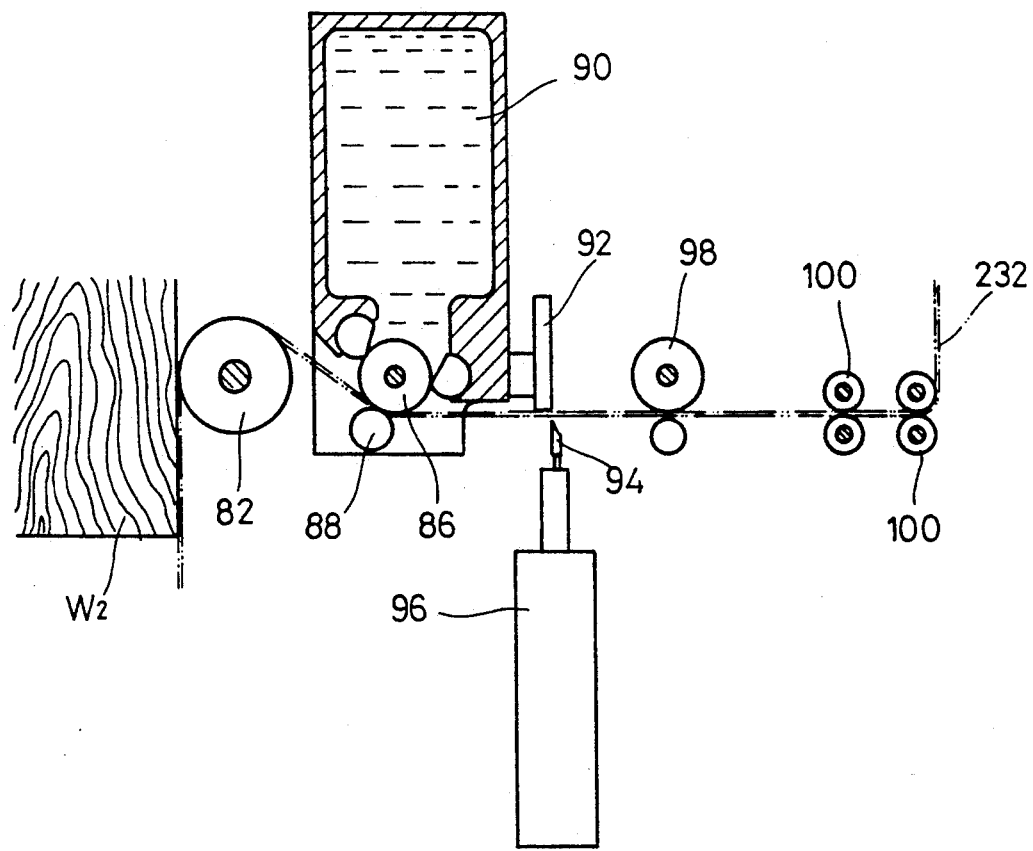
FIG. 6 is a schematic plan view for describing an essential part of the press-bonding mechanism shown in FIG. 5.

As shown in FIGS. 5 and 6, the support block 78 includes a cutter mounted thereon comprising a pair of stationary and movable blades 92, 94. An air cylinder 96 is activated to displace the movable blade 94 toward the stationary blade 92, thereby cutting a tape 232 (to be described later) used to be press-bonded onto edges of a workpiece, at a given position. Further, the support block 78 includes the feed rollers 98 and respective pairs of guide rollers 100, which are rotatably supported thereon.

Thus, when the air cylinder 74 is actuated, the cylindrical rod 76 thereof is activated to displace the support block 78 along the guide member 72. Correspondingly, the pressure roller 82, the adhesiveapplying roller 86, the adhesive-holding roller 88, the adhesive storage tank 90, etc. are integrally displaced. In this case, the pressure roller 82 is a freely-rotatable idle roller.

The trimming mechanism 14 will now be described below. The trimming mechanism 14 has a servomotor 209 mounted on the plate-shaped member 58, for turning a support block 160 to be described later about a $\theta$-axis. A rotatable drive shaft 104 of the servomotor 209 is held in engagement with a holding plate 150. The holding plate 150 has a pressure-applying air cylinder 156 fixedly mounted on its lower end. In addition, the holding plate 150 has a guide member 158 fixed to its lower surface and brought into interlocking engagement with the support block 160. The support block 160 is mounted on a sliding member fixed to the leading end of a cylindrical rod 161 of the air cylinder 156. The support block 160 has a trimming high-frequency motor 162 which is fixed thereto and has a rotatable shaft to which a pulley 164 for transmitting its rotational force to another pulley 168 by a belt 166 is fixed. A rotatable shaft 170 of the pulley 168 extends downward and supports a pair of trimming cutters 172, 174 on the leading end thereof. The trimming cutter 174 has a panel-side follow-up roller 176 fixedly mounted on its upper part, which is brought into contact with a side face of either a panel $W_1$ or $W_2$ as a workpiece to be described later. Incidentally, panel-upper/lower-sides follow-up rollers 178, 180 are disposed rotatably about their own axes in such a manner that they are adjacent to the corresponding trimming cutters 172, 174 and their turning directions are perpendicular to those of the cutters 172, 174 respectively.

Then, a cylinder 184 is fixedly mounted on the support block 160 so as to extend in the vertical direction. The support block 160 includes guide rails 186, 188 extending in the vertical direction and fixed thereto. A sliding member 190 is held in sliding engagement with the guide rail 186, whereas a sliding member 192 is held in sliding engagement with the guide rail 188. A holding member 194 is fixed to the sliding member 192, and a cylindrical rod 196 of the cylinder 184 engages the sliding member 192. In addition, the holding member 194 has a high-frequency motor 200 for an end cutter, fixed to its lower end. A first blade 202 for the end cutter is mounted on a rotatable shaft of the motor 200.

Figure 9:
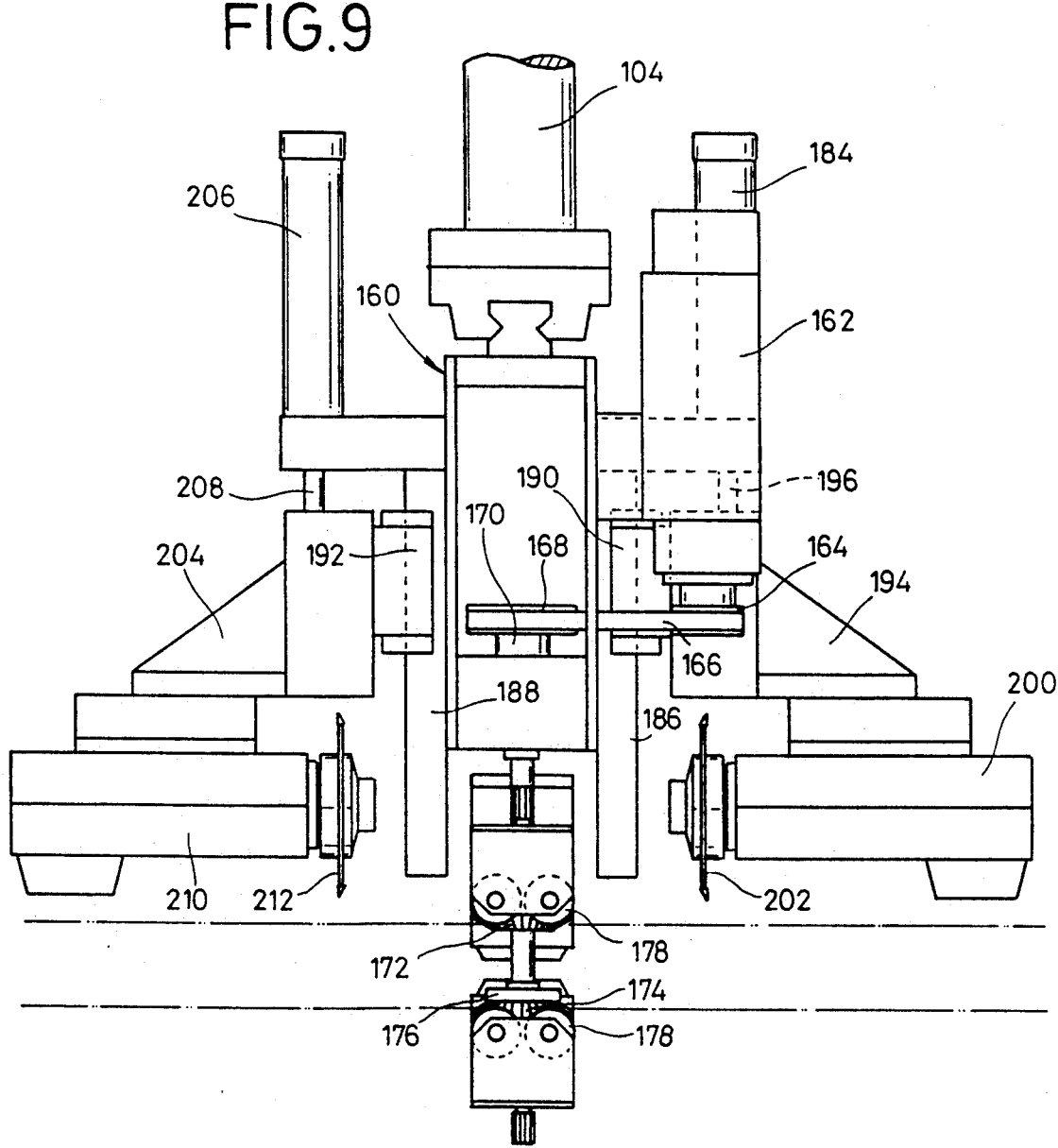
FIG. 9 is a front view of the trimming mechanism shown in each of FIGS. 7 and 8.

On the other hand, a holding member 204 is fixed to the sliding member 192, and has an air cylinder 206 for vertically elevating the end cutter, which is fixed to its upper part so as to extend in the vertical direction (see FIG. 9). A cylindrical rod 208 of the air cylinder 206 is held in engagement with the holding member 204. The holding member 204 has another high-frequency motor 210 for an end cutter, mounted on its lower end. A second blade 212 for the end cutter is supported rotatably on a rotatable shaft of the motor 210.

Figure 7:
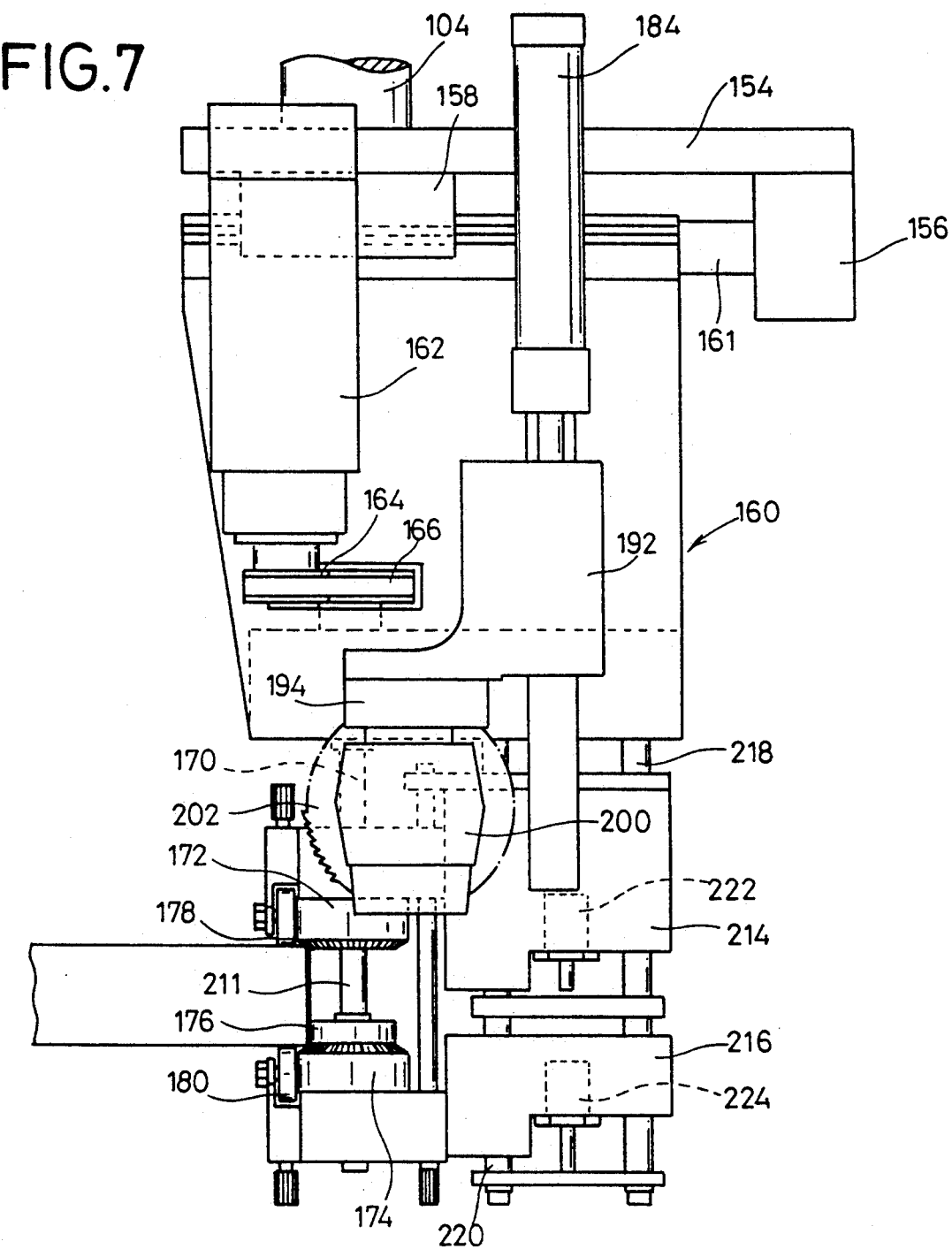
FIG. 7 is a fragmentary front view of a trimming mechanism of the apparatus.
Figure 8:
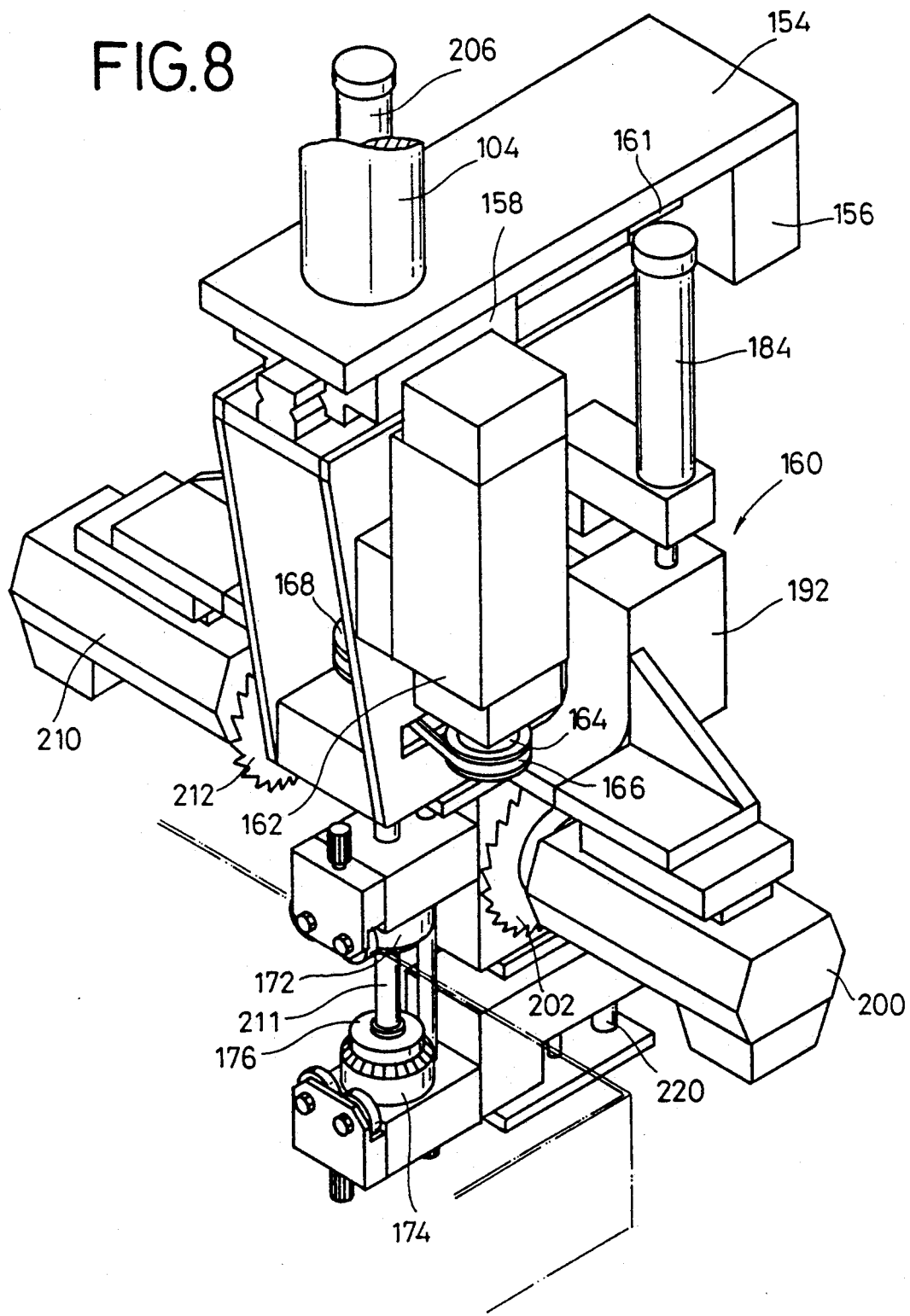
FIG. 8 is a perspective view of the trimming mechanism shown in FIG. 7.

Incidentally, designated at numerals 214, 216 in FIG. 7 are slide blocks for vertically elevating the trimming cutters, which are held in engagement with guide rails 218, 220 projecting from the support block 160. The slide block 214 includes an air cylinder 222 fixed thereto, whereas the remaining slide block 216 has an air cylinder 224 fixed thereto. Thus, when these air cylinders 222, 224 are actuated, the trimming cutters 172, 174 can be moved away from each other and displaced to approach each other in the vertical direction.

Further, numeral 226 in the drawings indicates a roll tape holder fixedly secured to the support 26. A roller 230 is fixedly mounted on the leading end of a resilient element 228 radially extending from the central axis of the roll tape holder 226. The tape 232 is then fed toward the feed rollers 98 in a state in which it is being twisted or turned through 90° by roller members under the tension of the roller 230.

The apparatus 10 referred to above is basically constructed as described above. A description will now be made of operation and advantages of the apparatus 10.

Figure 2:
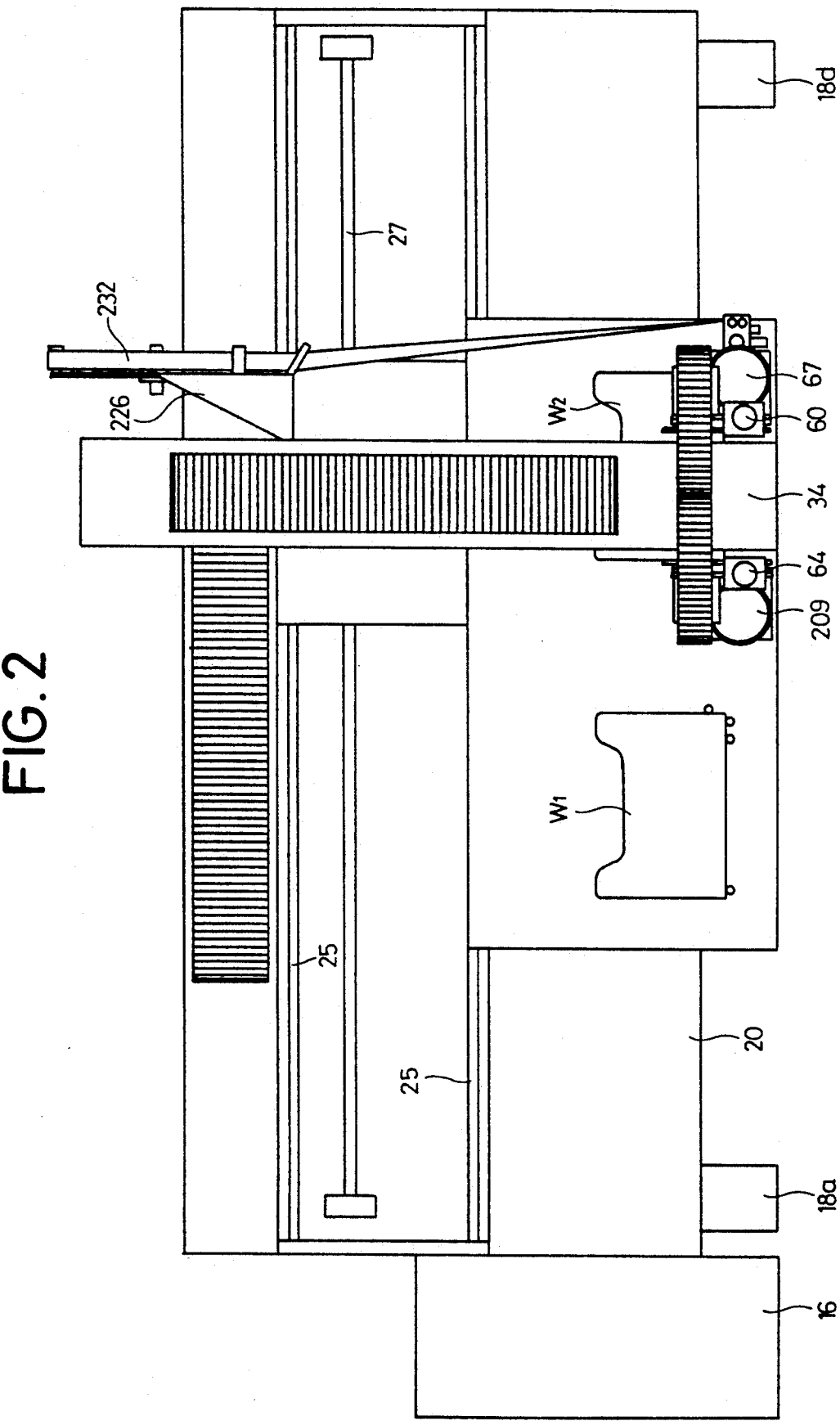
FIG. 2 is a plan view of the apparatus.
Figure 10:
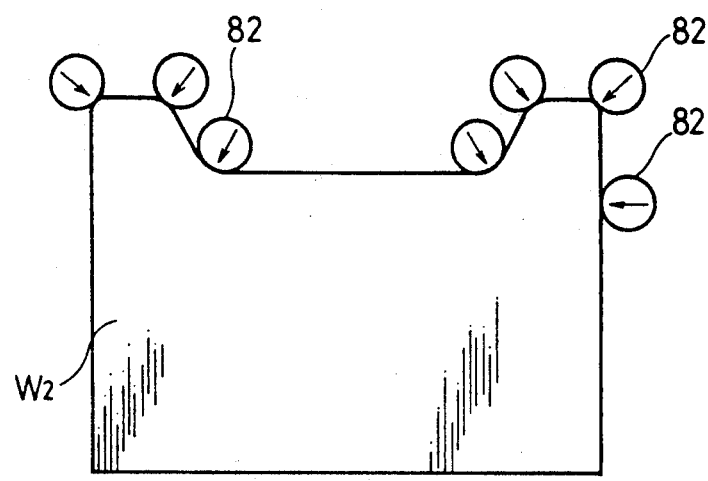
FIG. 10 is a view for describing respective directions of press-bonding forces produced when an edged-workpiece is press-bonded into a recess defined in a side face of the workpiece by using the press-bonding mechanism according to the present invention.

First of all, the apparatus 10 according to the present invention is basically activated based on the numerical control (NC). More specifically, the press-bonding mechanism 12 and the trimming mechanism 14 are actuated based on NC information supplied from the NC controller 16. The panels $W_1$, $W_2$ are first placed on the corresponding suction box groups 24a, 24b so as to be accurately positioned by their suction functions. easily understood from FIG. 2, the panels $W_1$, $W_2$ have portions deeply hollowed or bent inwardly thereof, i.e., recesses. The press-bonding mechanism 12 and the trimming mechanism 14 are now displaced together with the support 26 based on the NC information supplied from the NC controller 16 so as to be held in position. Then, the tape 232, which has been wound on the shaft of the roll tape holder 226 and subjected to given tension of the resilient element 228, is delivered to the guide rollers 100 by an operator. After completion of the passage of the tape 232 through the guide rollers 100, the tape 232 then passes through the feed rollers 98, and the cutter comprised of the stationary blade 92 and the movable blade 94, after which it is inserted between the adhesive-holding roller 88 and the adhesive-applying roller 86, followed by winding of the same on the pressure roller 82. Then, the press-bonding mechanism 12 is actuated. Described specifically, the servomotor 40 is energized to rotate and drive the ball-type screw 42, thereby displacing the holding unit 34 in the direction indicated by the arrow Y. If the holding unit 34 reaches a predetermined position, then the cylinder 60 is actuated, thereby displacing the cylindrical rod 62 and the plate-shaped member 56 along the rails 48a, 48b. Thus, when the press-bonding mechanism 12 is displaced downward, the pressure roller 82 is held in front of one of side faces of the panel $W_2$. When the rotative drive source 80 is energized, the turning force of the rotative drive source 80 is transmitted to the feed rollers 98 and the adhesive-applying roller 86 by the chain 87. Accordingly, the tape 232 is fed toward the side face of the panel $W_2$ while it being subjected to the given tension. In addition, the adhesive is applied over the entire surface of the adhesive-applying roller 86 from the adhesive storage tank 90. Then, the air cylinder 74 is actuated to displace the support block 78 toward the panel $W_2$, thereby pressing the pressure roller 82 against the side face of the panel $W_2$ with the tape 232 interposed therebetween. At this time the servomotor 97 is energized to rotate the support block 78, and the air cylinder 74 is actuated to press the support block 45 against the panel $W_2$ in the longitudinal direction thereof, i.e., in the direction normal to the side face of the panel $W_2$. Information about the position of the support block 78 is of course supplied from the NC controller 16. Thus, even though the recesses have been defined in the panel $W_2$, the pressure roller 82 can be fitted under pressure onto the recesses correspondingly (see FIG. 10). Therefore, any shape of the panel $W_2$ does not interfere with the action for pressing the tape 232 against the panel $W_2$ by the pressure roller 82. Thus, when the tape 232 substantially travels round the side faces of the panel $W_2$ based on the NC information, the air cylinder 96 is actuated. As a result, the movable blade 94 is displaced toward the stationary blade 92, thereby cutting the tape 232. When the tape 232 has travelled thereround and has been pressed against the panel $W_2$ by the pressure roller 82 in the above-described manner, the air cylinder 74 is actuated again to retract the cylindrical rod 76, thereby elevating the support block 78, with the result that a basic tape press-bonding step is completed.

Then, the trimming mechanism 14 is actuated. As has already been described above, the trimming mechanism 14 is actuated based on the NC information identical to that employed in the press-bonding mechanism 12.

The cylinder 64 is now actuated to lower the cylinder rod 66 thereof, thereby determining the entire position of the trimming mechanism 14. Then, the air cylinder 206 is actuated to lower the cylindrical rod 208 to thereby hold the second blade 212 in front of the leading end of the tape 232 press-bonded onto the panel $W_2$. Thereafter, the motor 210 is energized to rotate the second blade 212 at a high speed, thereby cutting the leading end of the tape 232.

After one of the ends of the tape 232 is cut under the rotation of the second blade 212 at a high speed as described above, the air cylinder 206 is actuated again to elevate the cylindrical rod 208, thereby returning the second blade 212 to its original position.

Then, the trimming cutters 172, 174 are held in front of the side face of the panel $W_2$. At this time, the air cylinders 222, 224 are actuated to adjust the distance between the trimming cutters 172 and 174 in accordance with the thickness of the panel $W_2$. When the motor 162 is energized to rotate the trimming cutters 172, 174 to thereby turn the roller 176 and the rollers 178, 180, unwanted portions of the tape 232, projecting from the upper and lower surfaces of the panel $W_2$, can be removed. At this time, the air cylinder 156 is normally being actuated so as to press the trimming cutters 172, 174 under the displacement of the support block 160.

Then, the air cylinder 184 is actuated to lower the cylindrical rod 196 thereof, thereby holding the first blade 202 in position. Further, when the motor 200 is energized, the other of the ends of the tape 232 is cut and removed.

After the sequential processes referred to above have been completed, the cylinder 184 is actuated to return the motor 200 and the first blade 202 to their original positions.

According to the present embodiment, as described above, even though the panel $W_2$ has the side faces each shaped in the form of an extremely-complicated concave portion, the pressure roller 82 is angularly displaced in conformity with its shape. Further, the support block 78 is activated to press against the pressure roller 82 in the direction normal to the surface of the tape 232, i.e., one of the side faces of the panel $W_2$. Thus, a press-bonding force of the pressure roller 82 is extremely large, and the mechanical action, i.e., the driving force of the air cylinder 74 can be controlled, thereby making it possible to provide a suitable press-bonding force.

Since each of components disposed near the pressure roller 82 is extremely simple in shape, the pressure roller 82 can enter any narrow space. It is therefore possible to easily process even panels having curved or hollowed shapes, which have heretofore been handled in dependence on the operator. Further, the press-bonding mechanism 12 and the trimming mechanism 14 can be actuated through the same travel paths by the numerical control (NC), thereby making it possible to simplify the control of each of both mechanisms.

According to the present invention, as has been described above, even when a workpiece is shaped into an extremely-complicated, bent form with its contour being heavily concaved inwardly of a side face thereof, a pressure roller can suitably be pressed against the side face of the workpiece. As a result, a tape can be pressed against the side face of the workpiece by suitable press-bonding force. In addition, the tape can rapidly be press-bonded onto the workpiece without the need for skilled labor power, thereby making it possible to appreciably increase output efficiency and reduce manufacturing cost.

Having now fully described the invention, it will be apparent to those skilled in the art that many changes and modifications can be made without departing from the spirit or scope of the invention as set forth herein.

What is claimed is:

1. An apparatus for press-bonding a tape onto side faces of a workpiece, said apparatus comprising:
    a tape press-bonding mechanism displaceable in X-axis, Y-axis and Z-axis directions, said mechanism including:
        a pressure roller for press-bonding the tape onto the side faces of the workpiece, said side faces having recesses defined therein;
        a block member for supporting said pressure roller thereon, said block member being engaged with a rotatable drive shaft;
        an actuator for displacing said block member and thereby said pressure roller toward the side faces, said actuator comprising a cylinder having a rod held in engagement with said block member; and
        rotative drive source means for rotating said block member about an axis of said drive shaft for displacing said block member through a desired angle,
    wherein said rotative drive source means is energized to angularly displace said block member and said cylinder is actuated when said pressure roller is placed in a confronting relationship with each of said recesses defined in the side faces of said workpiece, thereby holding said pressure roller against the side faces of said workpiece from a direction substantially normal to said side faces.

2. An apparatus according to claim 1, further comprising a trimming mechanism for cutting an end and upper and lower side edges of the tape, said trimming mechanism being disposed adjacent said tape press-bonding mechanism, wherein said tape press-bonding mechanism is actuated to carry out a process for press-bonding the tape onto one workpiece, and simultaneously said trimming mechanism is actuated to perform a process for trimming another workpiece disposed a predetermined distance from said one workpiece.

3. An apparatus according to claim 1, further comprising:
    a roll tape holder having the tape wound therein, and including a resilient element for applying a predetermined tension to said tape;
    a pair of feed rollers for inserting said tape therebetween to thereby feed said tape so a to be wound on said pressure roller; and
    cutting means disposed downstream of said feed rollers, for cutting said tape after said tape has been press-bonded onto said workpiece.

4. An apparatus according to claim 2, further comprising:
    a roll holder having the tape wound therein, and including a resilient element for applying a predetermined tension to said tape;
    a pair of feed rollers for inserting said tape therebetween to thereby feed said tape so as to be wound on said pressure roller; and
    cutting means disposed downstream of said feed rollers, for cutting said tape after said tape has been press-bonded onto said one workpiece.

5. An apparatus according to claim 1, further comprising:
    respective pairs of guide rollers disposed upstream of said feed rollers, for feeding the tape toward said pressure roller; and
    an adhesive-applying roller disposed downstream of said feed rollers, for applying an adhesive stored in an adhesive storage tank on the surface of said tape upon its delivery to said pressure roller.

6. An apparatus according to claim 2, further comprising:
    respective pairs of guide rollers disposed upstream of said feed rollers, for feeding the tape toward said pressure roller; and
    an adhesive-applying roller disposed downstream of said feed rollers, for applying an adhesive stored in an adhesive storage tank on the surface of said tape upon is delivery to said pressure roller.

7. An apparatus according to claim 3, further comprising:
    respective pairs of guide rollers disposed upstream of said feed rollers, for feeding the tape toward said pressure roller; and
    an adhesive-applying roller disposed downstream of said feed rollers, for applying an adhesive stored in an adhesive storage tank on the surface of said tape upon its delivery to said pressure roller.

8. An apparatus according to claim 4, further comprising:
    respective pairs of guide rollers disposed upstream of said feed rollers, for feeding the tape toward said pressure roller; and
    an adhesive-applying roller disposed downstream of said feed rollers, for applying an adhesive stored in an adhesive storage tank on the surface of said tape upon its delivery to said pressure roller.

9. An apparatus according to claim 5, wherein an adhesive-holding roller is disposed so as to engage an outer peripheral surface of said adhesive-applying roller, and said adhesive-applying roller and said adhesive-holding roller are rotatably driven by said rotative drive source.

10. An apparatus according to claim 6, wherein an adhesive-holding roller is disposed so as to engage an outer peripheral surface of said adhesive-applying roller, and said adhesive-applying roller and said adhesive-holding roller are rotatably driven by said rotative drive source.

11. An apparatus according to claim 7, wherein an adhesive-holding roller is disposed so as to engage an outer peripheral surface of said adhesive-applying roller, and said adhesive-applying roller and said adhesive-holding roller are rotatably driven by said rotative drive source.

12. An apparatus according to claim 8, wherein an adhesive-holding roller is disposed so as to engage an outer peripheral surface of said adhesive-applying roller, and said adhesive-applying roller and said adhesive-holding roller are rotatably driven by said rotative drive source.

* * * * *